UNITED STATES PATENT OFFICE.

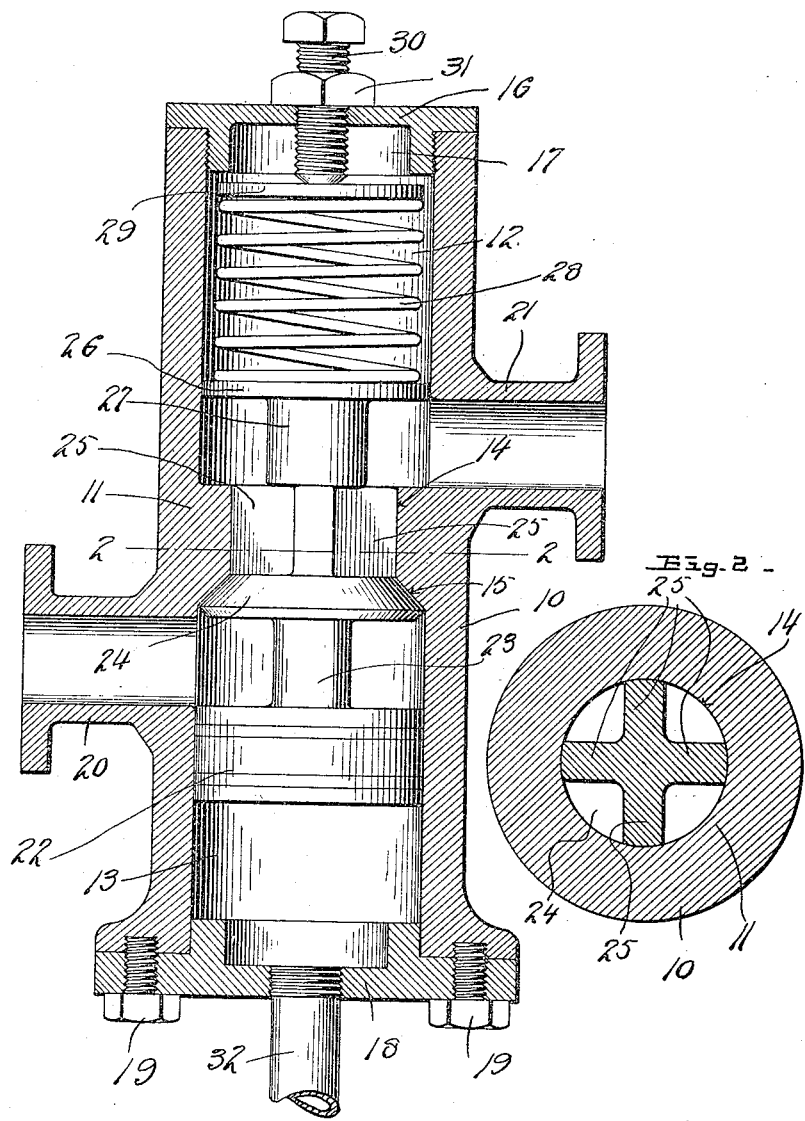

HARRY SCHWANEBECK, OF BALTIMORE, MARYLAND.

AUTOMATIC ATMOSPHERE-VALVE.

1,224,221.

Specification of Letters Patent.

Patented May 1, 1917.

Application filed March 31, 1916. Serial No. 88,073.

*To all whom it may concern:*

Be it known that I, HARRY SCHWANEBECK, a citizen of the United States, residing at Baltimore, in the State of Maryland, have invented certain new and useful Improvements in Automatic Atmosphere-Valves, of which the following is a specification.

This invention relates to an improved automatic atmosphere valve and the principal object of the invention is to provide a valve for allowing steam from the auxiliary steam exhaust of an engine to escape to the atmosphere, the valve being normally closed and retained in a closed position by steam and moved to an open position by a spring when the supply of steam closing the valve is cut off.

Another object of the invention is to so construct the valve that it may be held open the proper amount by the escaping steam from the auxiliary steam exhaust, a tension adjusting screw being provided for the spring.

Another object of the invention is to provide a valve so constructed that it may be easily taken apart for cleaning purposes or for repair purposes.

This invention is illustrated in the accompanying drawings, wherein:—

Figure 1 is a vertical longitudinal sectional view through the valve.

Fig. 2 is a transverse sectional view taken along the line 2—2 of Fig. 1.

The valve housing 10 is provided with a partition 11 dividing the housing into the upper and lower chambers 12 and 13, the passageway 14 being provided for permitting communication between these chambers 12 and 13 and the lower face of the partition being cut to form a valve seat 15. This valve housing is open at its upper and lower ends, a closure cap 16 being held upon the upper end of the valve housing by means of the externally threaded collar 17 and the lower end of the housing is closed by a cap or bonnet 18 held in place by means of the bolts 19. An inlet nozzle or pipe connection 20 extends from the valve housing beneath the partition 11 and an outlet nozzle or pipe connection 21 extends from the opposite side of the valve housing above the partition 11 so that steam from an auxiliary steam exhaust passing into the nozzle 20 must pass through the passage 14 in order to reach the chamber 12 and pass out through the outlet nozzle 21.

Within the chamber 13, there is provided a piston 22 having a stem 23 extending above the upper end of the piston and supporting a valve 24 which will seat upon the valve seat 15 and is provided with webs or flukes 25 extending through the passageway 14. By the provision of this piston 22, steam entering the chamber 13 or steam cylinder as it might be termed, will move the piston upwardly thus bringing the valve 24 into tight engagement with the valve seat 15 and preventing the steam from the auxiliary steam exhaust from passing through the passageway 14 and out through the nozzle 21.

In the upper chamber 12, there is slidably mounted a washer 26 provided with a depending neck 27 engaging the flukes of the valve 24 so that when the washer is moved downwardly by means of the spring 28 positioned between the washer 26 and the washer 29, the valve will be moved off its seat 15 and the steam from the auxiliary steam exhaust permitted to pass through the passage 14 and out through the pipe 21. An adjusting screw 30 is carried by the cap 16 and engages the washer 29 for regulating the tension of the spring 28, a locking nut 31 being provided to hold the adjusting screw in a set position.

When this valve is in use, it is connected with the pipe 32 leading from the steam chest and the nozzles 20 and 21 are connected with the auxiliary exhaust pipe and outlet pipe. When the engine is running, the steam entering the chamber or cylinder 13 will retain the valve and piston in the position shown in Fig. 1 thus preventing the steam from the auxiliary steam exhaust passing through the passage 14. When the engine is brought to a stop, pressure of the steam in the cylinder is relieved and the spring 28 will move the washer 26 downwardly thus moving the valve 24 to an open position and permitting the steam from the auxiliary steam exhaust to escape through nozzle 21. This escaping steam will however, have sufficient force to prevent the washer 26 from moving to close the passage 14. As soon as the engine is again started the pressure of the steam in chamber 13 will again move the piston upwardly to close the valve.

I have therefore provided a valve which will open and close according to whether the engine is in motion or at a standstill and have further provided a valve which does not need to be manually actuated, thus saving time and trouble in attending to the valve for the auxiliary steam exhaust.

What is claimed is:—

1. A valve comprising a valve housing, closures for the upper and lower ends of said valve housing, a pipe carried by the lower closure, an adjusting screw carried by the upper closure, a partition in the valve housing intermediate its length and provided with a passage terminating in a valve seat at the lower end of the partition, an inlet nozzle leading from the valve housing beneath the partition, an outlet nozzle leading from the valve housing above the partition, a piston slidably mounted in the lower portion of the valve housing and provided with a stem terminating in a valve seating against the valve seat when the piston is in a raised position, the valve being provided with flukes extending through the passageway of the partition, a washer in the upper portion of the valve housing provided with a neck engaging the flukes of said valve, a spring engaging said washer, and a washer positioned between said spring and said adjusting screw.

2. A valve comprising a valve housing provided intermediate its length with a partition having a passageway formed therein and provided with a valve seat at its lower end, a piston slidably mounted in the lower portion of said valve casing having an upwardly extending stem terminating in a valve head seating against the valve seat and provided with flukes extending through the passageway, the valve casing being provided with an inlet positioned intermediate the piston and valve head when the piston is in a raised position, a steam supply communicating with the valve casing beneath the piston, a washer slidably mounted in the upper portion of the valve casing and provided with a neck engaging the flukes of said valve head, the valve casing being provided with an outlet positioned intermediate the washer and the partition, and resilient means engaging the washer to move the same toward the partition when steam pressure beneath the piston is reduced.

In testimony whereof I affix my signature in presence of two witnesses.

HARRY SCHWANEBECK.

Witnesses:
CHARLES R. BOETTGER,
J. F. HAWKINS.

Copies of this patent may be obtained for five cents each, by addressing the "Commissioner of Patents, Washington, D. C."